United States Patent
Zanotti

(10) Patent No.: US 9,445,578 B2
(45) Date of Patent: Sep. 20, 2016

(54) TRANSPORTING UNIT FOR LIVE POULTRY AND HANDLING METHOD USING THE TRANSPORTING UNIT

(71) Applicant: Massimo Zanotti, Gussago (IT)

(72) Inventor: Massimo Zanotti, Gussago (IT)

(73) Assignee: Massimo Zanotti, Gussago (Brescia) (IT)

( * ) Notice: Subject to any disclaimer, the term of this patent is extended or adjusted under 35 U.S.C. 154(b) by 272 days.

(21) Appl. No.: 14/220,941

(22) Filed: Mar. 20, 2014

(65) Prior Publication Data

US 2014/0283755 A1    Sep. 25, 2014

(30) Foreign Application Priority Data

Mar. 20, 2013   (IT) .............................. TO2013A0214

(51) Int. Cl.
*A01K 31/07*    (2006.01)
*A01K 45/00*    (2006.01)

(52) U.S. Cl.
CPC .............. *A01K 31/07* (2013.01); *A01K 45/005* (2013.01)

(58) Field of Classification Search
CPC .. A01K 45/005; A01K 31/002; A01K 31/07; A01K 1/0236; A01K 1/0245; A01K 31/005; B60P 3/04
USPC ........ 119/489, 490, 843, 844, 453, 462, 401
See application file for complete search history.

(56) References Cited

U.S. PATENT DOCUMENTS

| 3,812,822 A | * | 5/1974 | Blankenship | ........ A01K 45/005 119/453 |
| 3,895,727 A | * | 7/1975 | Rucker | ................ A01K 45/005 119/401 |
| 3,996,896 A | * | 12/1976 | Slaats | .................. A01K 31/005 119/453 |
| 4,084,714 A | * | 4/1978 | Williams | .................. B60P 3/04 119/401 |
| 4,273,071 A | * | 6/1981 | Clark | ................... A01K 45/005 119/453 |
| 4,285,299 A | * | 8/1981 | Thomas | ............... A01K 45/005 119/453 |

(Continued)

FOREIGN PATENT DOCUMENTS

| AU | 551823 B2 | 5/1986 |
| EP | 0384530 A1 | 8/1990 |

(Continued)

OTHER PUBLICATIONS

Italian Search report for Corresponding Italian Patent Application No. TO2013A000214 filed Mar. 20, 2013, completed on Nov. 12, 2013.

*Primary Examiner* — Yvonne Abbott-Lewis
(74) *Attorney, Agent, or Firm* — Smith, Gambrell & Russell, LLP

(57) ABSTRACT

A transporting unit for live poultry including a quadrangular supporting frame and a plurality of drawer-type cages open at the top, arranged in a superimposed condition in the frame and slidably displaceable outwards through a first side of the supporting frame, in a partially extracted condition to enable loading of the poultry from a site located at a second side of the frame from the lowermost drawer kept inserted within the frame. The frame is configured to enable simultaneous loading of the poultry into each drawer-type cage from an additional site located at a third side of the supporting frame which is opposite to the second side.

20 Claims, 16 Drawing Sheets

(56) References Cited

U.S. PATENT DOCUMENTS

| | | | | |
|---|---|---|---|---|
| 4,365,591 A | * | 12/1982 | Wills | B65D 85/50 119/843 |
| 4,998,967 A | * | 3/1991 | Box | A01K 31/07 119/489 |
| 5,060,596 A | * | 10/1991 | Esbroeck | A01K 45/005 119/453 |
| 5,388,948 A | | 2/1995 | Jerome | |
| 5,596,950 A | * | 1/1997 | Briggs | A01K 31/02 119/489 |
| 5,913,286 A | * | 6/1999 | Showalter | A01K 45/005 119/843 |
| 6,338,316 B1 | * | 1/2002 | Weaver | B65D 1/22 119/453 |
| 6,338,318 B1 | * | 1/2002 | Apichom | A01K 1/0107 119/453 |
| 6,347,604 B1 | * | 2/2002 | Lapere | A01K 45/005 119/843 |
| 7,389,745 B2 | * | 6/2008 | Weaver | A01K 45/005 119/440 |
| 2003/0136350 A1 | * | 7/2003 | Giordano | A01K 45/005 119/453 |
| 2008/0236508 A1 | * | 10/2008 | Seay | A01K 31/002 119/453 |
| 2013/0032095 A2 | | 2/2013 | Zanotti | |
| 2015/0000608 A1 | * | 1/2015 | Zanotti | A01K 31/002 119/401 |
| 2015/0125243 A1 | * | 5/2015 | Zanotti | A01K 45/005 414/353 |

FOREIGN PATENT DOCUMENTS

| | | |
|---|---|---|
| EP | 0867113 A2 | 9/1998 |
| EP | 1330952 A2 | 1/2003 |
| FR | 2750567 A1 | 1/1998 |
| GB | 2129672 A | 5/1984 |
| WO | 2011010329 A1 | 1/2011 |

* cited by examiner

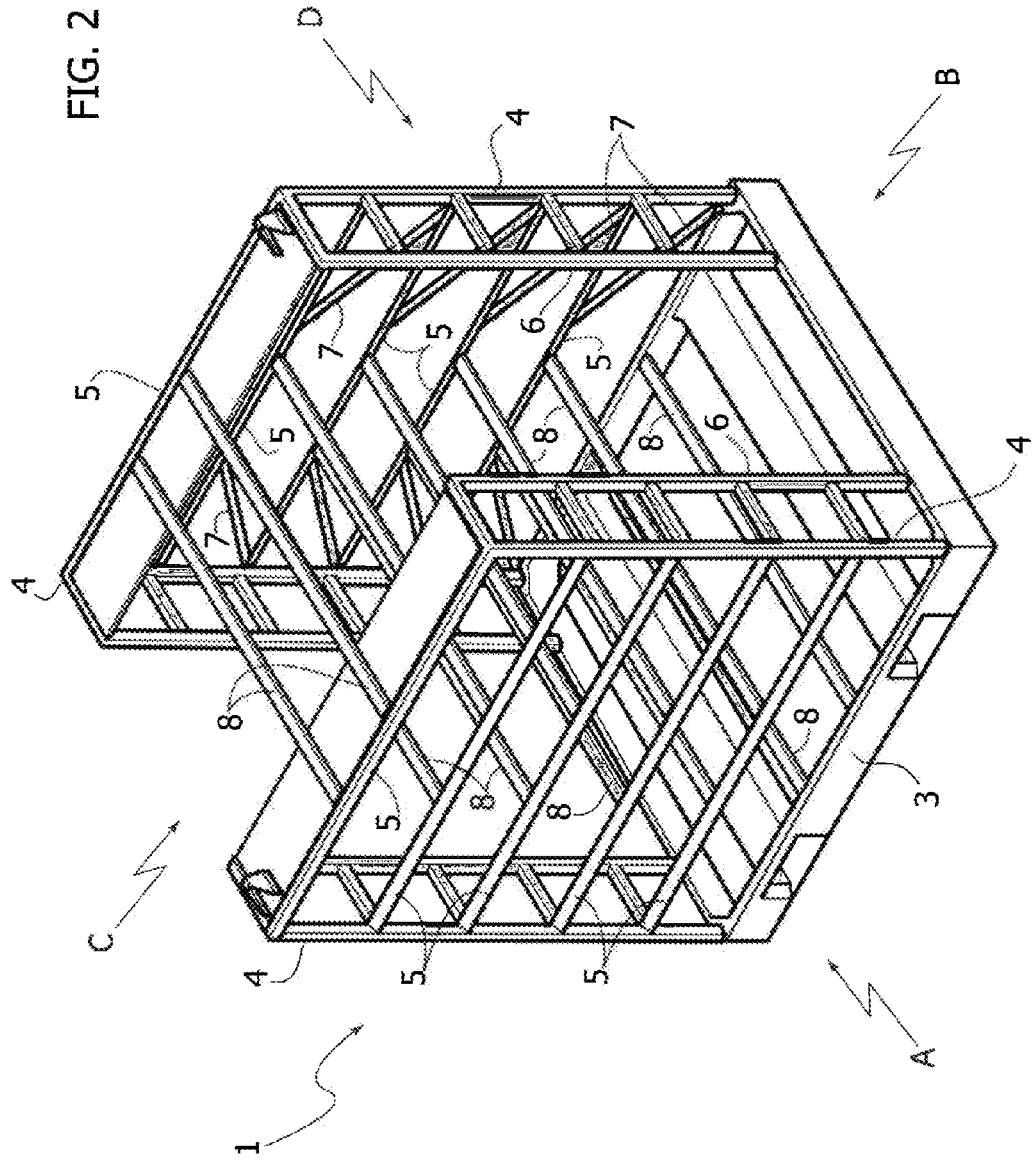

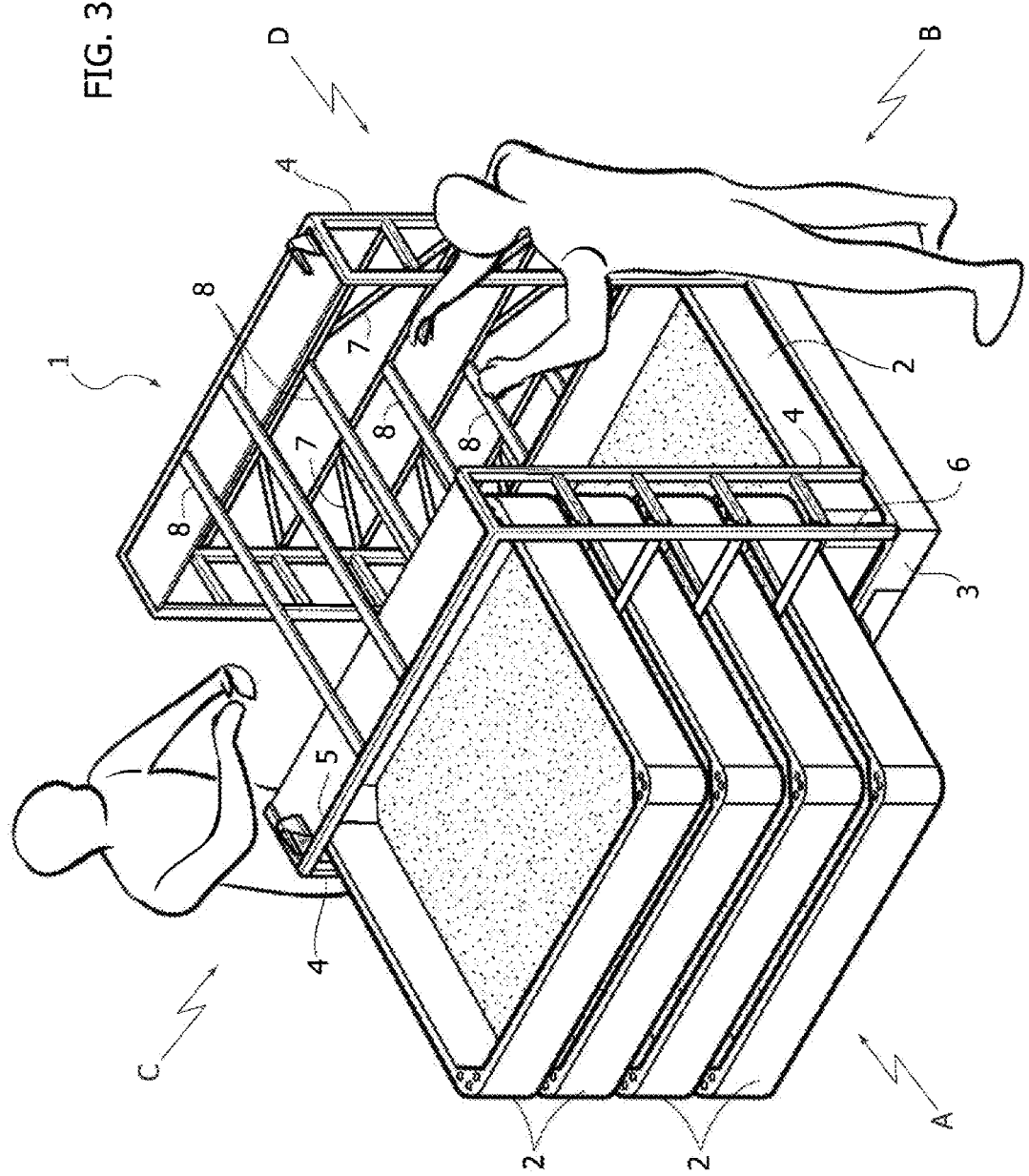

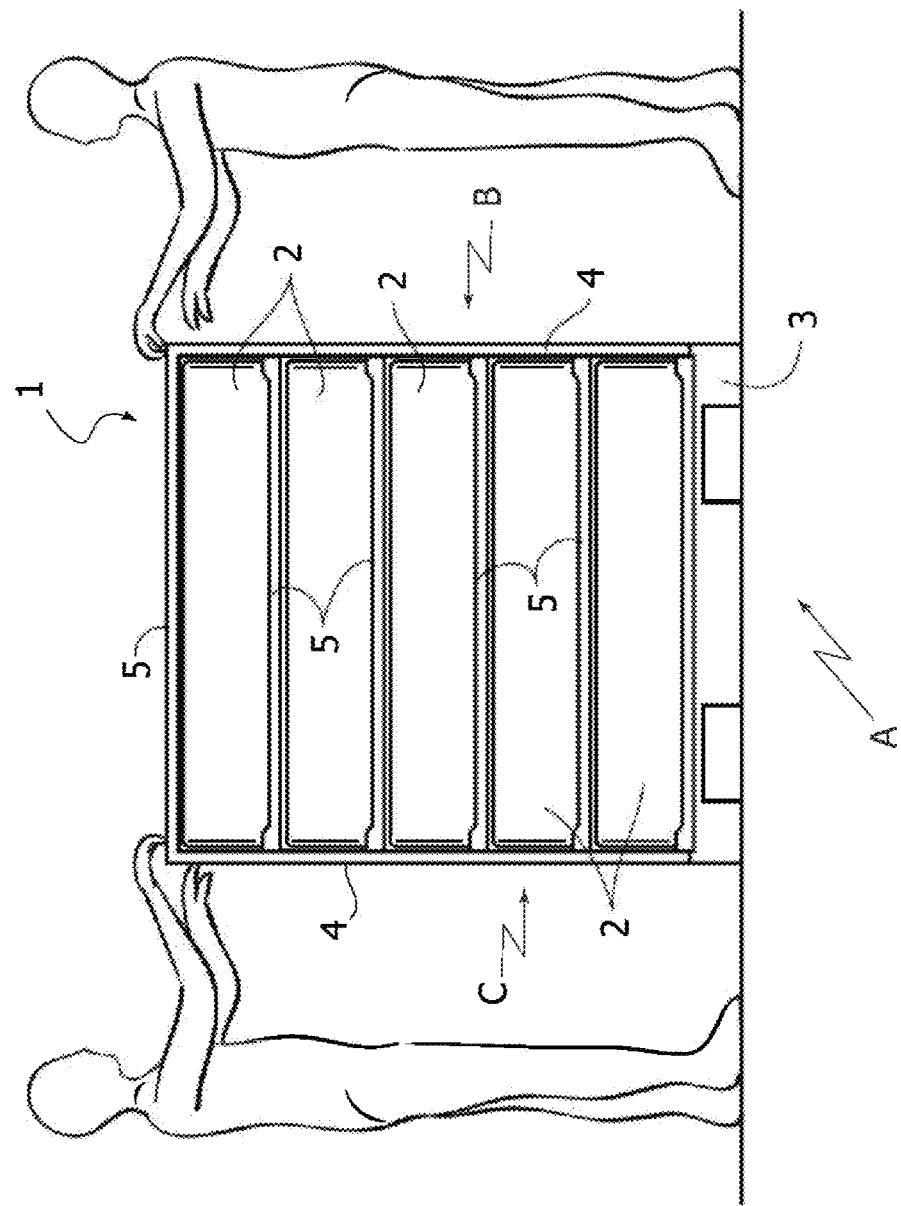

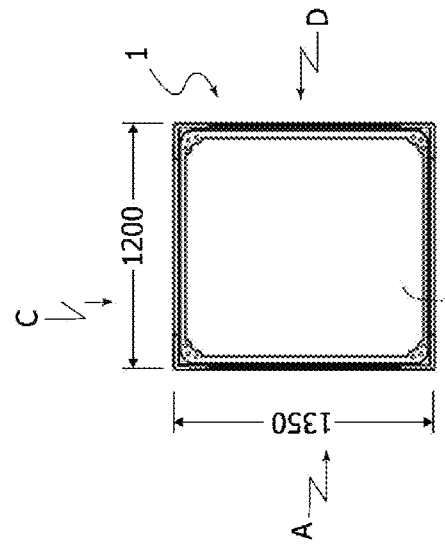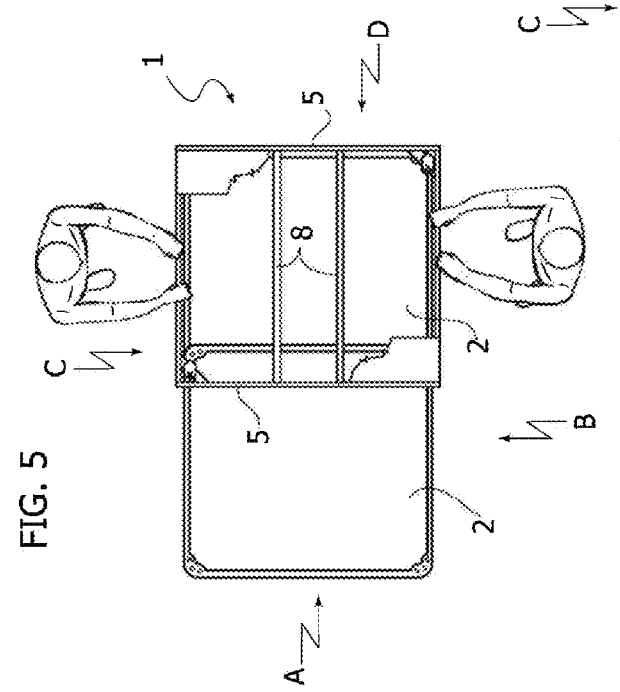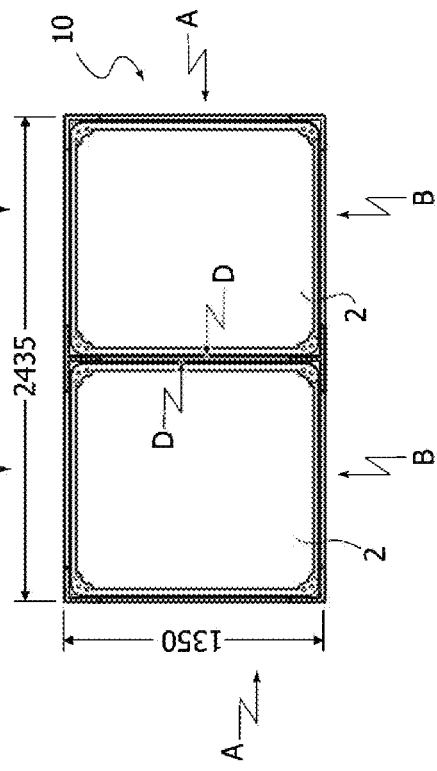

TRANSPORTING UNIT FOR LIVE POULTRY AND HANDLING METHOD USING THE TRANSPORTING UNIT

CROSS REFERENCE TO RELATED APPLICATIONS

This application claims priority from Italian patent application No. TO2013A000214, filed on Mar. 20, 2013, the entire disclosure of which is incorporated herein by reference.

This application is also related to co-owned U.S. Ser. No. 14/220,961, filed on Mar. 20, 2014, entitled "Plant and Method for Handling Live Poultry in a Slaughterhouse".

FIELD OF THE INVENTION

The present invention relates in general to transporting live poultry from farms to slaughterhouses, typically on board trucks, and particularly regards the loading step of the poultry and the subsequent handling after transport.

STATE OF THE PRIOR ART

From the patent document EP-1330952B1, of which the Applicant is co-inventor, a method and a system are known for transporting live poultry using a transporting unit including a quadrangular supporting frame and a plurality of drawer-type cages, open at the top, and arranged in a superimposed condition in the supporting frame. The drawer-type cages are slidably displaceable outwards through a first side of the frame in a partially extracted condition to enable loading of the poultry according to a procedure that first involves filling of the lowermost drawer kept inserted within the supporting frame, then reinsertion of the drawer set immediately above, within the supporting frame, in order to close the top of the lowermost drawer, and then repeating the same steps for each drawer up to the filling of the uppermost drawer, which is finally closed at the top by a cover applied above the frame.

This solution is particularly advantageous with respect to other conventional techniques, such as the one described in the document GB-2129672 according to which the drawers are extracted one at a time from one of the sides of the supporting frame where the poultry is loaded, from a single site, starting from the uppermost drawer. Following filling, the drawer is reinserted into the frame and then the extraction of the drawer below proceeds. In the reinsertion step of each filled drawer, the poultry is subjected to trauma and injuries caused by the impact against the bottom of the drawer above.

The solution known from EP-1330952 is even more advantageous as compared to other systems which provide for poultry loading from above into cages formed by non-extractable compartments, such as that described in document EP-0384530, which involves the construction of each compartment, kept stationary within the frame, into two mutually longitudinal sliding parts, and where the subsequent unloading of the poultry is carried out by dropping, following tilting of the frame with its related compartments.

However, in the system according to EP-1330952 the supporting frame is configured in such a way that the loading of the poultry into the drawer-type cages can be implemented, either manually or mechanically, at just one side of the frame: typically the front side opposite to the back side from which the drawer-type cages are partially extracted. Although, in theory, the possibility cannot be excluded that the poultry is loaded from a different side of the frame, perpendicular to the side of partial extraction of the drawers, introducing the poultry into the drawer-type cages of a stack is anyway carried out at one single site

SUMMARY OF THE INVENTION

The present invention proposes to further improve the system according to the document EP-1330952, and in particular to increase the efficiency of poultry loading into the transporting unit in order to optimize the operation.

According to a first aspect of the invention, this object is achieved by means of a transporting unit for live poultry of the type defined in the preamble of claim 1, whose primary characteristic resides in that the supporting frame is configured in such a way to enable the simultaneous loading of poultry into each same drawer-type cage from an additional site located at a third side of the frame opposite to the second side. The second and the third sides are perpendicular to the first side from which the drawer-type cages are partially extracted during loading.

Thanks to this solution idea, the efficiency of the poultry loading, carried out either manually or with the aid of motorized equipment, is optimized, in practice halving the time normally required for such an operation. Each drawer, in practice, is approximately half-loaded from one site, and half-loaded from the other site.

Preferably, the first side of the frame is substantially fully open, while the second and the third sides have respective unobstructed wide apertures for access to the drawers, however configured so as to prevent the extraction of the drawers therethrough.

According to a further advantageous feature, the frame has bearing planes for the drawers to slide through the first side, and these bearing planes are conveniently formed by horizontal elements interconnecting the first side with the fourth side of the frame, opposite to the first side, and which substantially only extend along the centerline of the frame. The bearing planes are also advantageously devoid of differences in height, so that the sliding of the drawers from the retracted position to the extracted position, and vice versa, with respect to the supporting frame takes place according to horizontal paths parallel to the bottom of the drawers, and the first side of the frame is, in this case, provided with retaining means of the drawers when they are inserted within the frame. These retaining means can consist of mechanical or magnetic or any other functionally equivalent locking members.

According to another advantageous feature of the invention, the frame of the unit can be configured to contain two groups of drawers stacked side-by-side, or in other words it is dual, and defines two first sides arranged on opposite sides of the supporting frame, and through each of which a respective group of drawers is insertable and extractable. In this case, the arrangement is such as to allow the filling of the drawers from two pairs of side-by-side sites located at the second and third sides of the frame, respectively.

The invention also relates to a method for the handling of live poultry using the unit referred to above, following the transport to the slaughterhouse.

BRIEF DESCRIPTION OF THE DRAWINGS

The invention will now be described in detail with reference to the attached drawings, provided purely by way of non-limiting example, wherein:

FIG. 2 is a view analogous to FIG. 1 showing the supporting flame of the unit without the relative drawer-type cages, FIG. 3 is a perspective view showing the transporting unit of FIG. 1 during an initial step of poultry loading, FIG. 4 is a front elevational view of FIG. 3, FIG. 5 is a plan view from above of FIG. 3, FIG. 6 is a schematic plan view of the frame of FIG. 1, which exemplifies its dimensions, FIG. 7 shows a variant of FIG. 6 relating to a second embodiment of the transporting unit for poultry according to the invention.

DETAILED DESCRIPTION OF THE INVENTION

Figure 1:
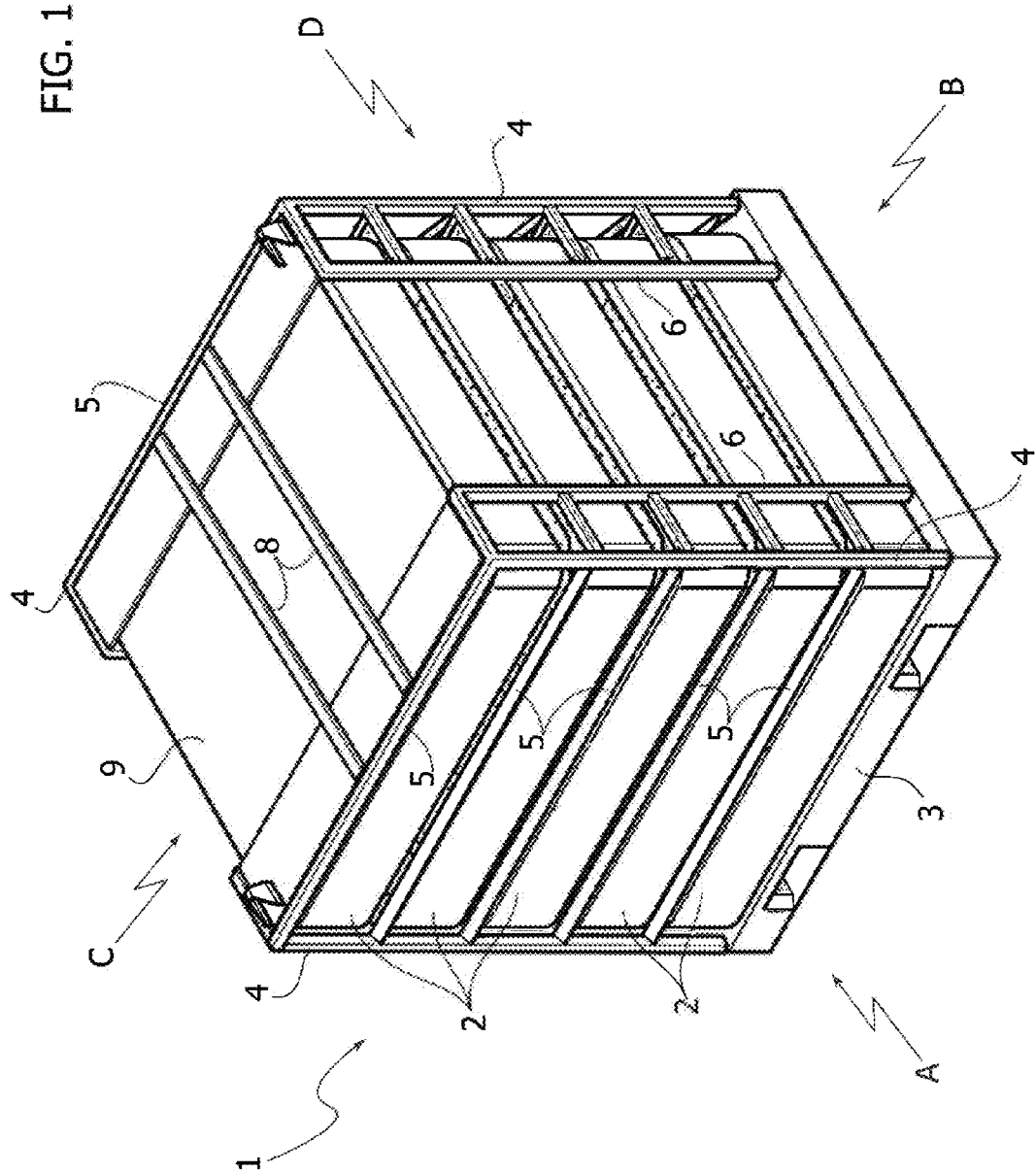
FIG. 1 is a schematic perspective view showing a first embodiment of the transporting unit for live poultry according to the invention, represented in the inserted condition of the drawer-type cages within the supporting frame.
Figure 8:
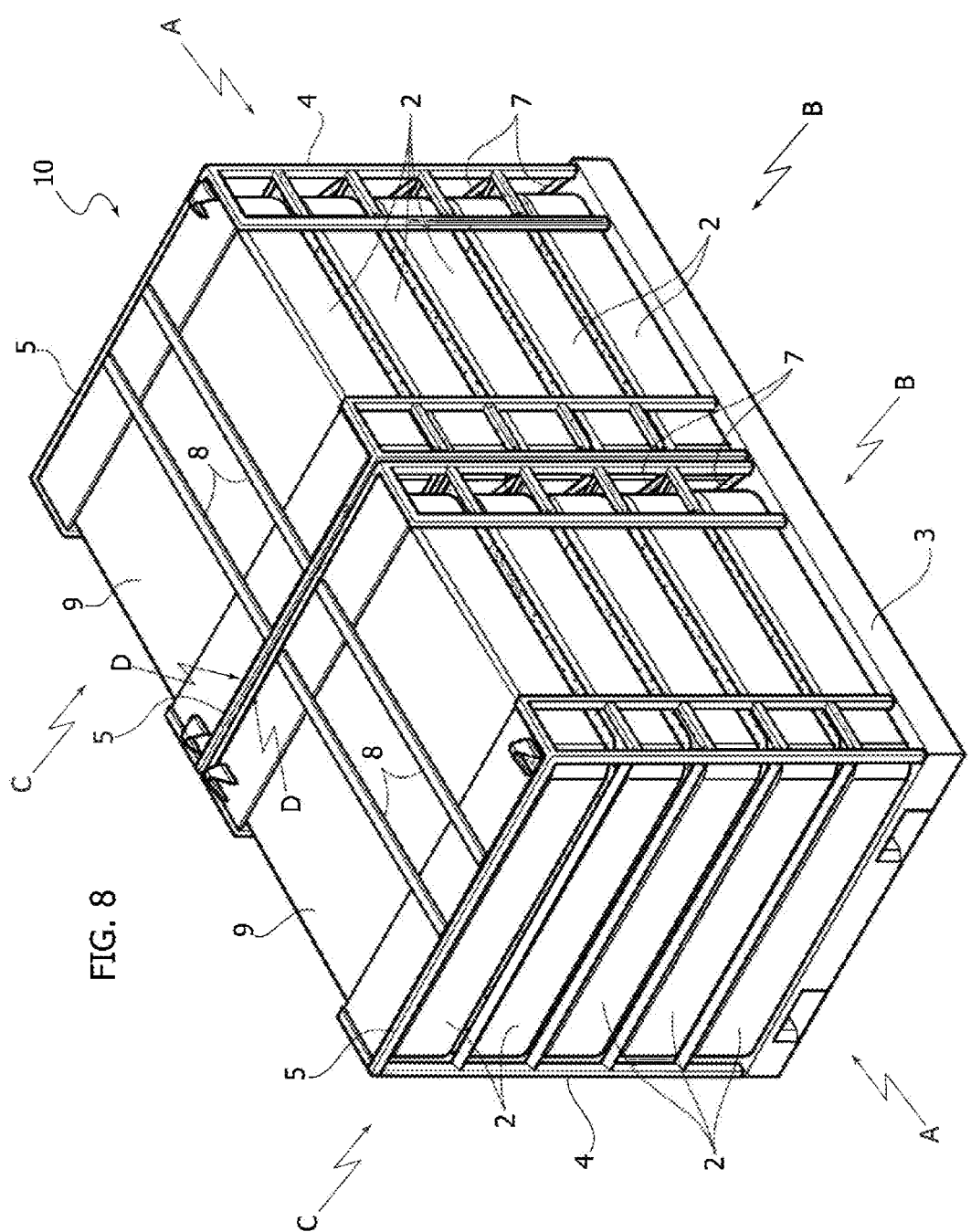
FIG. 8 is a view analogous to FIG. 1 of the second embodiment of the transporting unit according to the invention.
Figure 9:
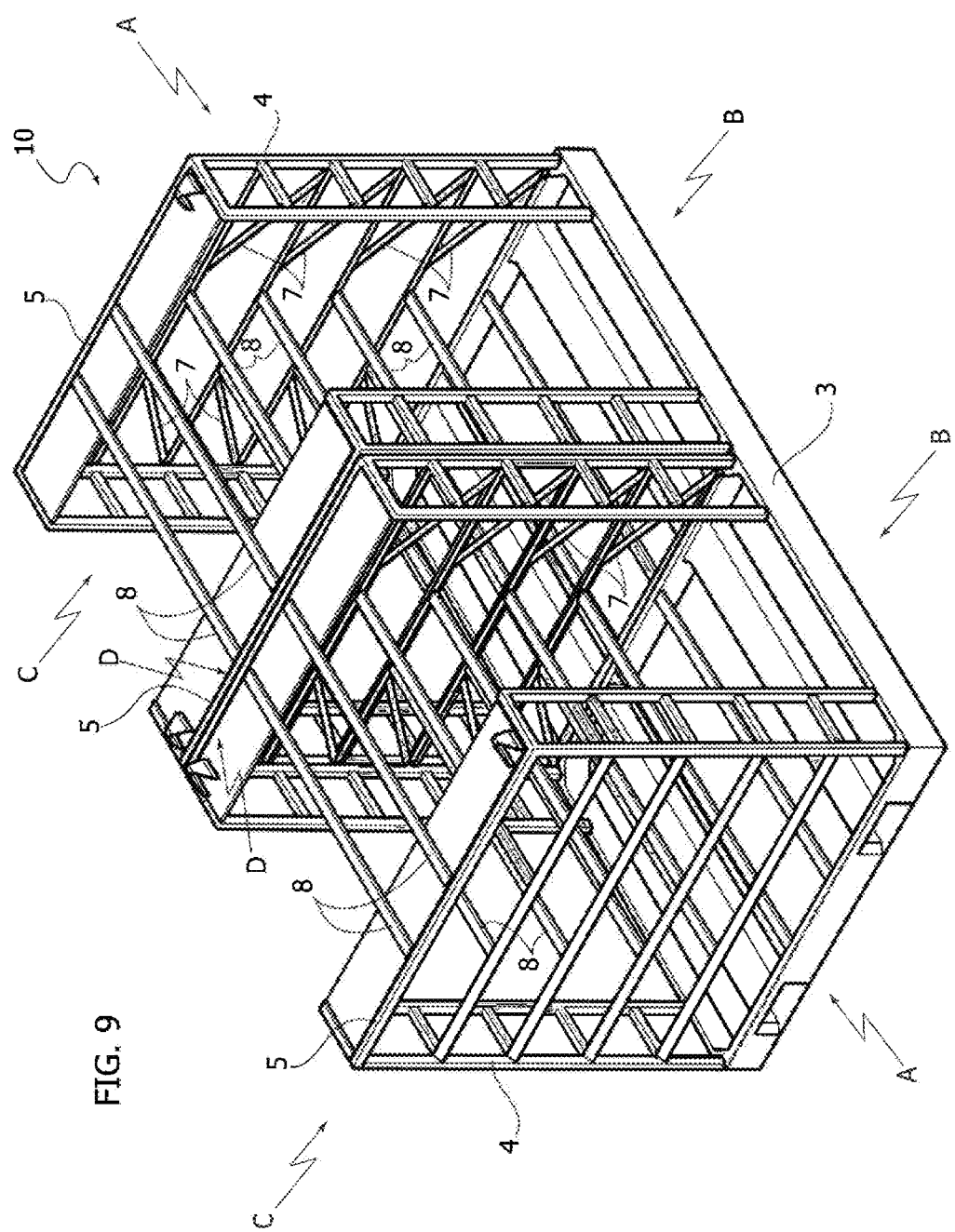
FIG. 9 is a perspective view showing the supporting frame of the unit according to FIG. 8 without its drawer-type cages.

Referring initially to FIGS. 1 and 2, in a first embodiment, the invention includes a single transporting unit used for transporting live poultry from the breeding place to the slaughterhouse by means of a truck.

The single unit is essentially composed of a sturdy quadrangular metal frame 1, having a generally parallelepiped shape with a horizontal rectangular cross-section, arranged to support a plurality (five in number in the illustrated example) of drawer-type cages 2.

The drawer-type cages 2 are generally of a known type, and for brevity will not be described in detail: for the present invention, it is sufficient to clarify that these drawer-type cages 2 are each conveniently formed by a single quadrangular body of molded plastic material with a bottom wall and side walls, open at the top. The drawer-type cages 2 can be, for example, of the type described and illustrated in document EP-0867113B1 or in document WO-2011/010329.

The supporting frame 1 comprises a pallet-shaped base 3, manipulatable by means of the forks of a forklift truck or the like, from which corner vertical uprights 4 extend.

The four vertical sides of the supporting frame 1 will be hereafter referred to as follows: first side A, second side B perpendicular to the first side, third side C opposite the second side B, and fourth side D opposite the first side A.

At the side A, through which the drawer-type cages 2 are slidably insertable and extractable in the manner clarified below, and at the opposite side D, the relative corner uprights 4 are connected, from their top, by horizontal crossbeams 5 spaced vertically by a distance slightly greater than the height of each drawer 2. The second side B and the third side C of the frame 1 are devoid of these horizontal crossbeams and therefore have wide unobstructed apertures for access to the inside of the frame 1, or rather to the drawers 2. These apertures are bordered laterally by respective additional uprights 6 that extend a short distance from the corner uprights 4 and prevent the extraction of the drawers 2 through these sides B and C.

The fourth side D contains, in addition to the horizontal crossbeams 5, additional obstruction elements 7, for example, diagonal, which also prevent the passage of the drawers 2.

Between the first side A and the fourth side D horizontal elements 8 extend, essentially only along the centerline of the frame 1, which define narrow slidable bearing planes of the drawers 2. These horizontal elements 8, which can be in the form of strips or pairs of bars, are rigidly connected by a part of the horizontal crossbeams 5 of the first side A and by the side opposite to the corresponding horizontal crossbeams 5 of the fourth side D, essentially level with each other, or rather essentially without any differences in height.

The absence of differences in height prevents the drawers 2, during their sliding relative to the frame 2, from being subjected to jolts and bumps, and from forming shearing points with the crossbeams 5, which could endanger the safety of the poultry below. For their retention within the supporting frame 1, in particular during the handling of the modules and in during their transportation on board a truck, the first side A is conveniently equipped with a locking system of the drawers 2 which may be made, in a manner not shown but within the scope of those skilled in the art, by mechanical or even magnetic or other functionally equivalent members.

For reasons that will be apparent hereinafter, the plan dimensions of the supporting frame 1 are typically those indicated in FIG. 6: width 1,350 mm and length 1200 mm.

The drawer-type cages 2 are, as said, slidable along the bearing elements 8 between the partially extracted position from the frame 1 through the first side A, in the manner represented in FIGS. 3 and 5, and the completely retracted position within the frame 1, represented in FIG. 1, to enable the live poultry loading in the manner clarified below. When inserted within the frame 1, the drawers 2 cannot be extracted through the second or the third sides B, C, due to the presence of the vertical uprights 6, or through the obstructed fourth side D.

With the arrangement described above, the loading of live poultry into the drawers 2 is carried out in the manner exemplified in FIGS. 3 to 5, either manually or with the aid of mechanized equipment, simultaneously loading the poultry from two sites located in front of the second side B and in front of the third side C, respectively. In this way, in practice, each drawer is half-loaded from one site, and half-loaded from the other site.

The loading methodology is analogous to that described in the aforementioned document EP-1330952, but with a speed and efficiency therefore doubled.

Initially, the four drawer-type cages 2 arranged above the lowermost drawer-type cage 2 are partially extracted from the frame 1 in the manner (deliberately exaggerated) represented in FIGS. 3 and 5, by sliding them along the respective bearing planes 8 through the first side A. In this way, the lowermost cage 2 is rendered immediately accessible from above, both through the second side B and through the third side C, for at least half of its extension, so as to enable a convenient and easy introduction of the poultry into the frame, simultaneously from both sites.

At the end of the filling of the lowermost drawer 2, the drawer 2 immediately above is reinserted within the frame 1 in such a way so that its bottom wall closes the lowermost drawer 2 on top, like a lid. Then the filling of the second drawer 2 proceeds, keeping the drawers 2 above in the partially extracted position. This proceeds in a similar manner until the complete filling of the uppermost drawer 2, above which is then normally applied a closing sheet 9 positioned on the top of the frame 1.

After filling, the frame 1 with the drawers 2 is transferred on board a transport vehicle to be sent to the slaughterhouse where the poultry will be unloaded onto the relative treatment apparatus, simply by completely pulling out the drawers 2 from the first side A of the frame 1.

Figure 12:
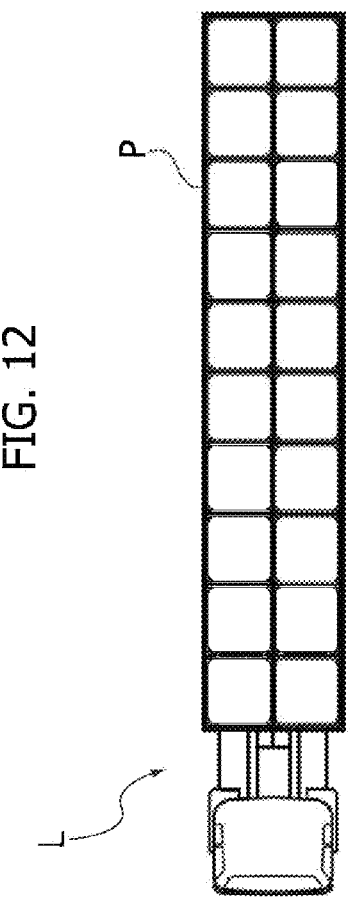
FIG. 12 is a diagrammatic plan view, on a reduced scale, showing the arrangement of the transporting unit according to the invention on board a truck.
Figure 14:
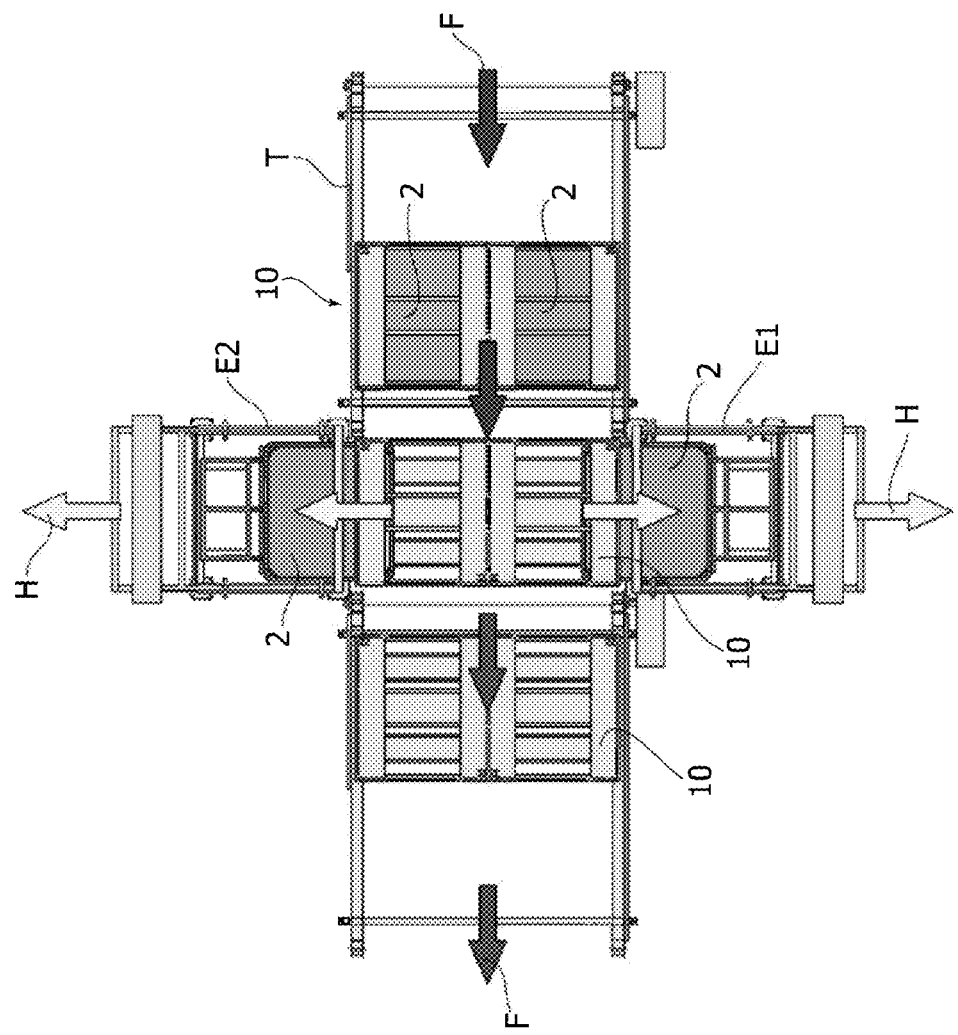
FIG. 14 is a schematic plan view from above that exemplifies a step of the handling method of the unit according to the embodiment of FIGS. 7-9, following transporting of the poultry to a slaughterhouse.
Figure 15:
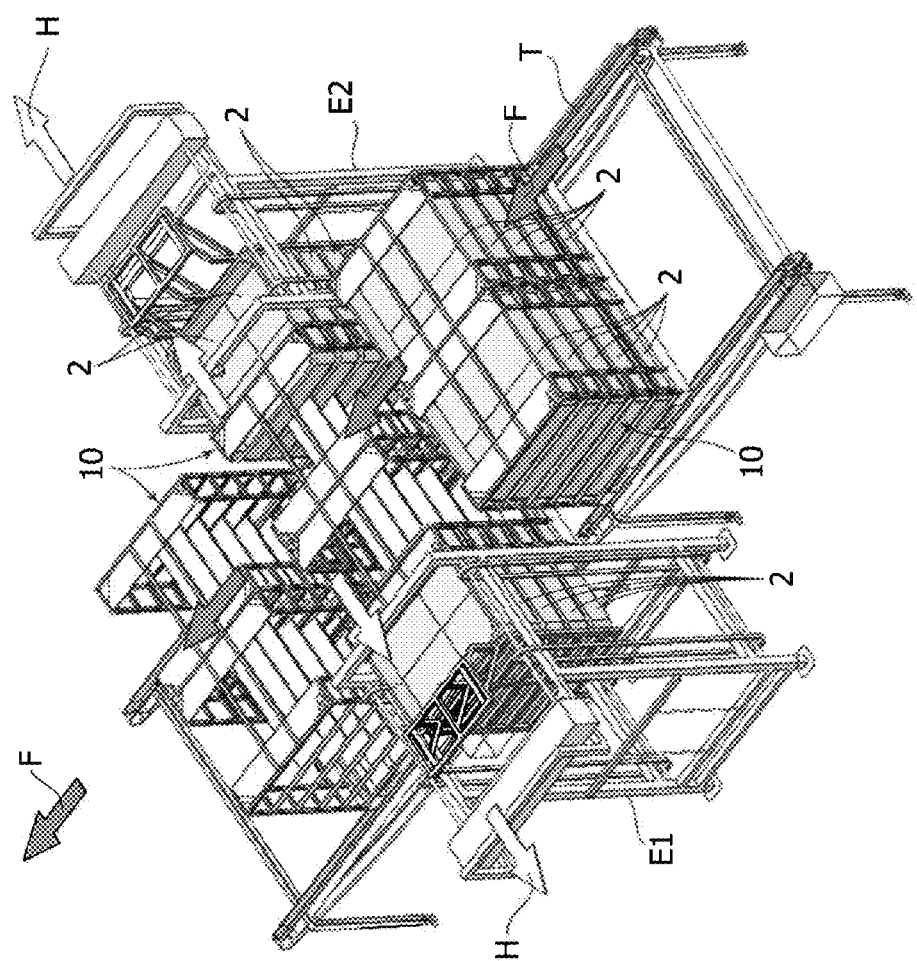
FIG. 15 is a perspective view of FIG. 14.
Figure 16:
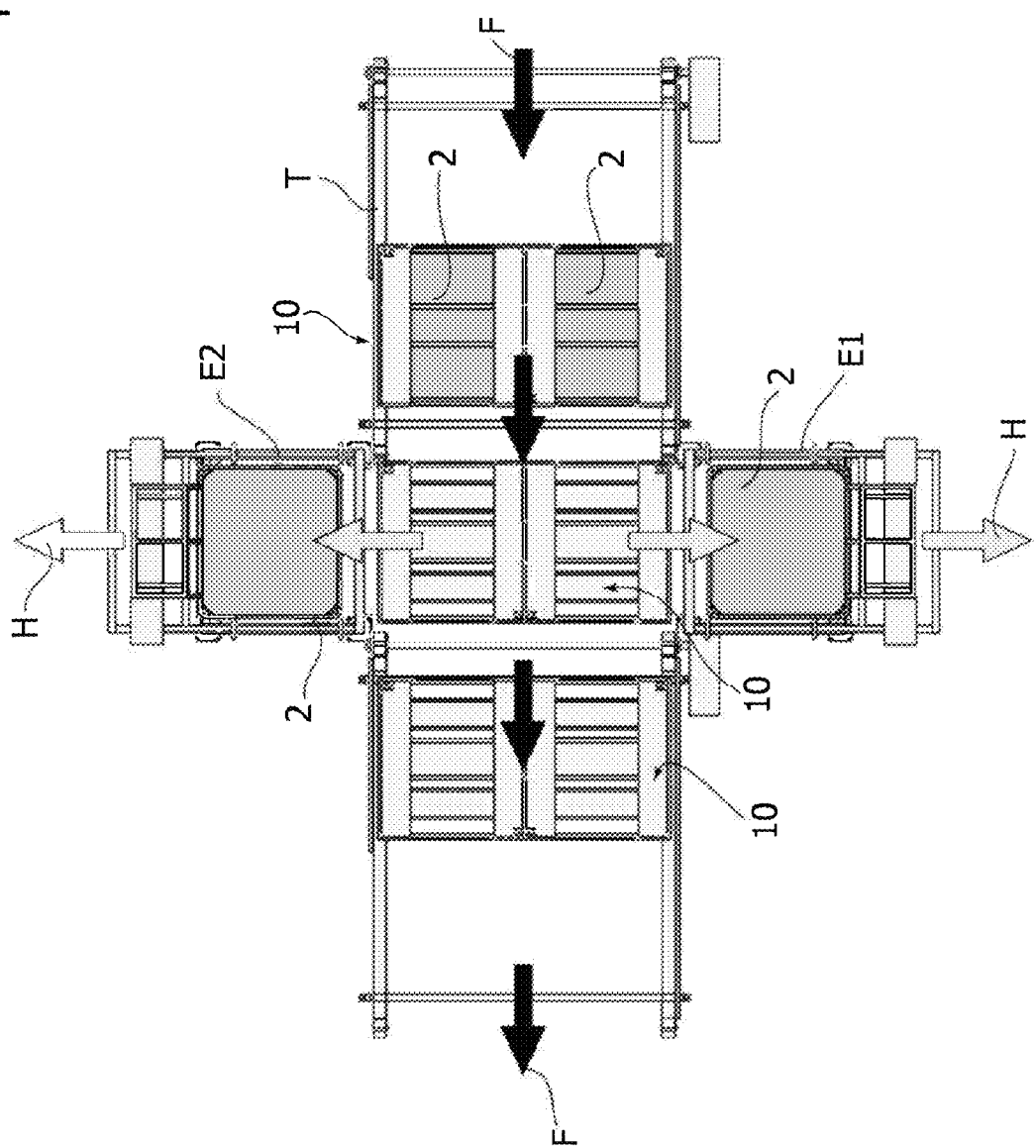
FIG. 16 is a view analogous to FIG. 14 showing a later step of the handling method.
Figure 17:
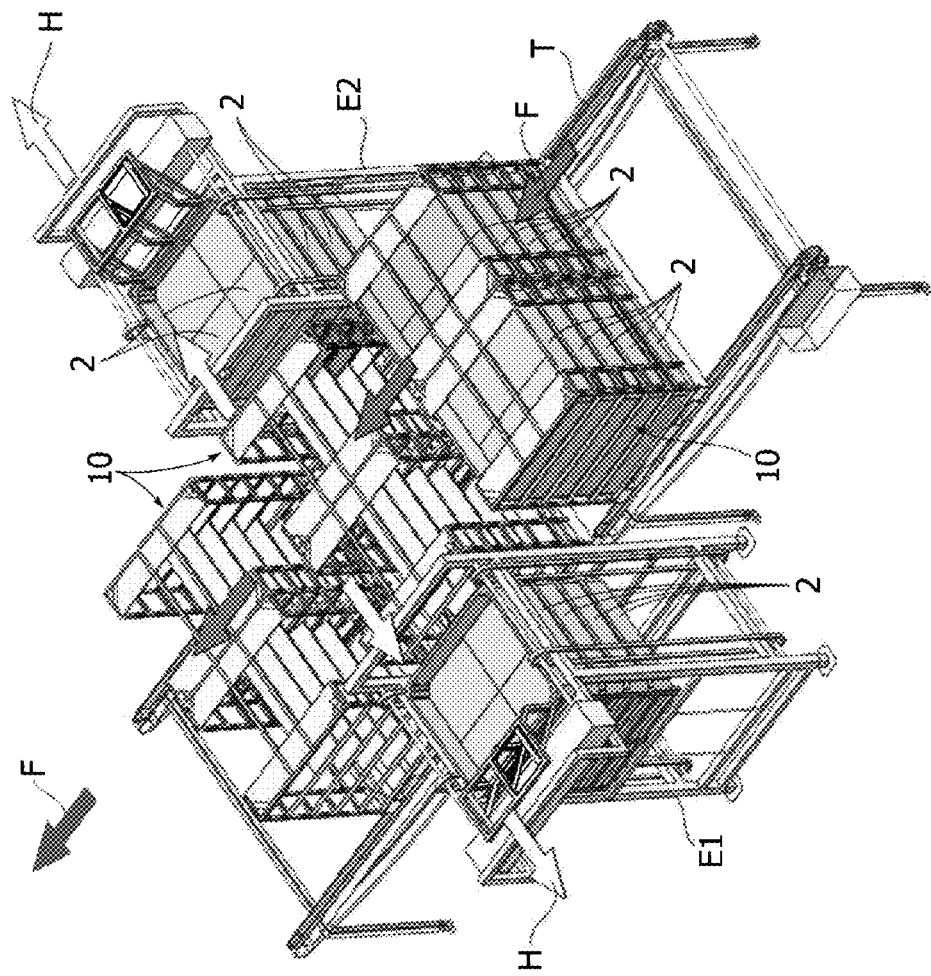
FIG. 17 is a perspective view of FIG. 16.

FIG. 12 schematically shows the placement of a plurality of modules formed by the individual frames 1 and of the relative drawers 2, described above, on the loading deck P of a transport truck L. The modules are positioned in side-by-side pairs on the loading deck P and, with the previously described dimensions of the supporting frame 1, the entire space of the deck P is advantageously occupied, both in width and in length. The modules of each pair are arranged on the deck P so that the respective sides A face outwards, so as to be able to subsequently extract the drawers 2 without the need to unload the modules from the truck L.

Figure 13:
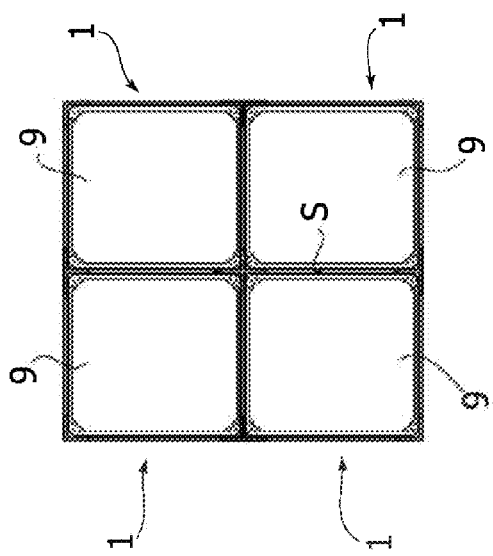
FIG. 13 shows a detail of FIG. 12 on an enlarged scale.

The outer conformation of the frames 1 is such so that, when the modules are positioned on the loading deck P in the manner described above, between each pair of adjacent units a separation gap is defined along the length of the loading deck that ensures an effective aeration and ventilation of the poultry during transport. This separation gap, indicated by S in FIG. 13, is at least in the order of 80 mm.

Alternatively, to the single configuration of the supporting frame 1 as described above, the invention includes, as a variant, a dual configuration of the frame, indicated by reference 10 in FIGS. 7 to 11, wherein identical or similar parts to those described previously are indicated with the same numerical references.

The dual unit 10, in practice, is formed by the rigid union of a pair of single units 1 whose sides D are connected or possibly in common. The dimensions of the dual unit 10 are those shown in FIG. 7 (width 2,435 mm, length 1,350 mm) in order to be able to occupy, in the arrangement shown schematically in FIG. 12, the entire width of the loading deck P of the transport truck L.

Figure 10:
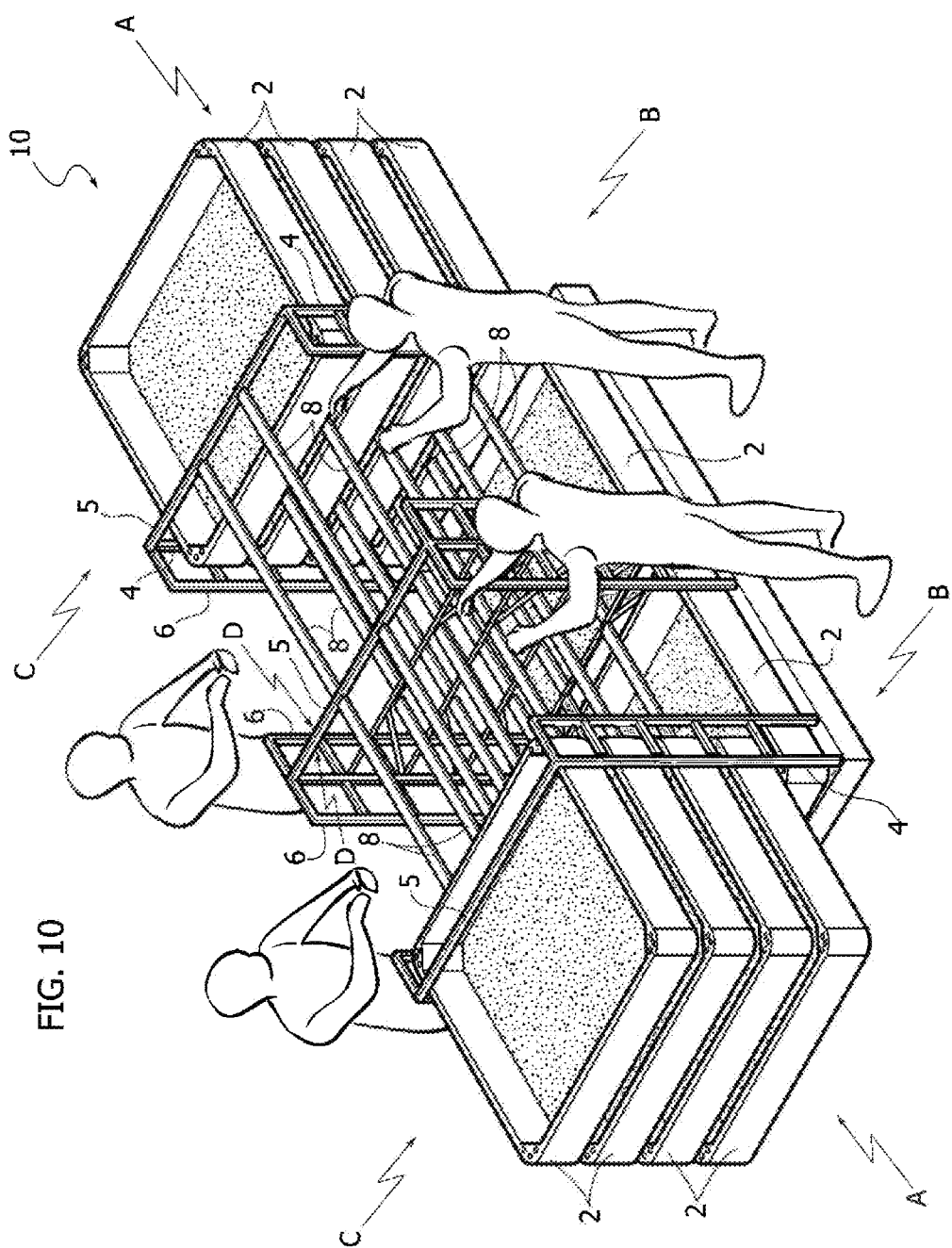
FIG. 10 is a view analogous to FIG. 3 relative to the variant of the unit according to FIG. 8.
Figure 11:
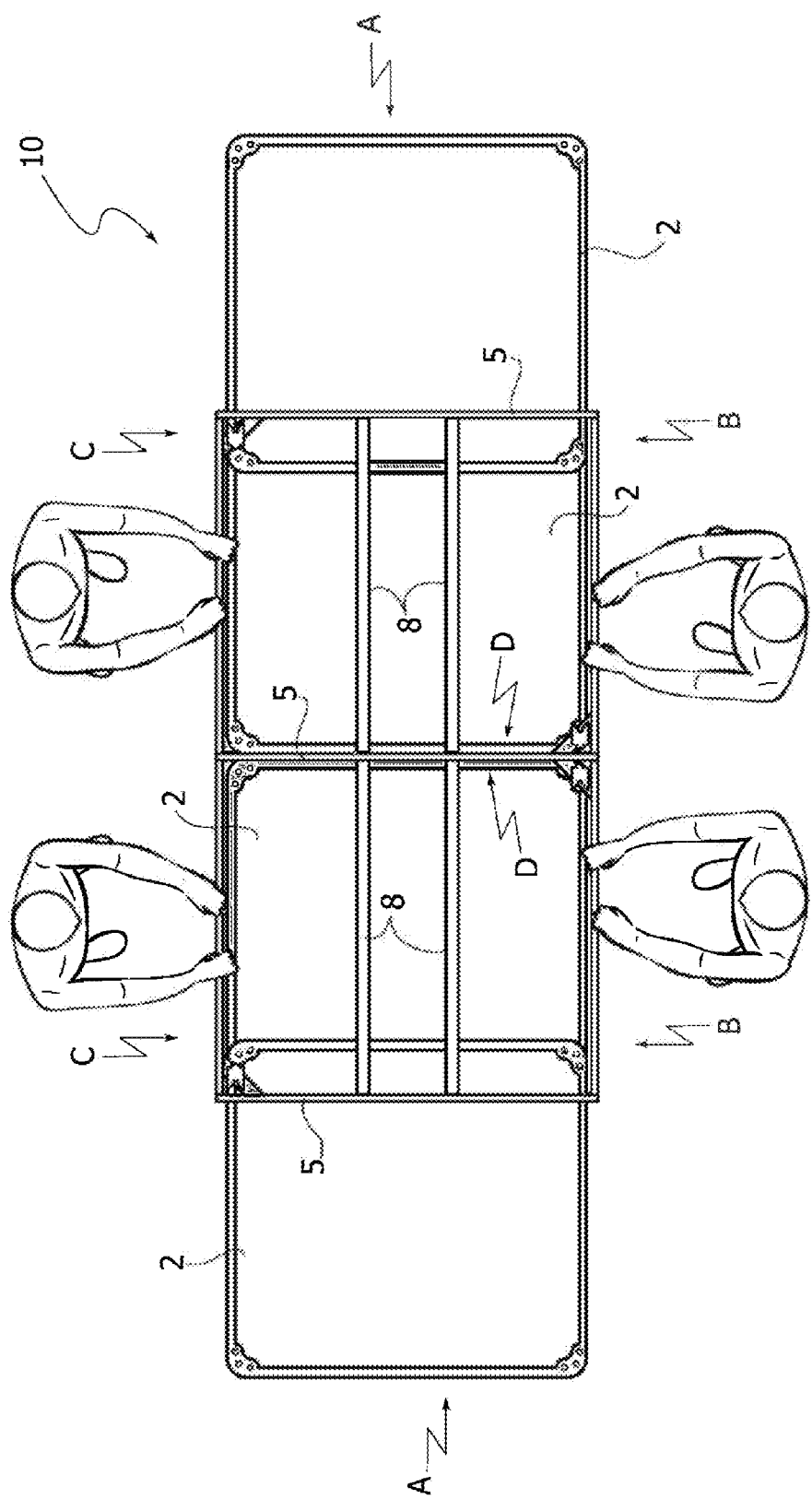
FIG. 11 is a plan view from above of FIG. 10.

The structure of each of the two single units that make up the dual unit 10 is analogous to that described previously, and the filling modes of each of the two groups of drawer-type cages 2, carried by the dual frame 10, are also analogous: the drawers 2 are partially extracted in opposite directions through the two first sides A of the dual frame 10, and are then each filled simultaneously, starting from the lowermost drawers 2, operating at two pairs of sites arranged side-by-side at the second sides B and at the third sides C, as shown in FIGS. 10 and 11.

In this case as well, the dual units are positioned on the loading deck P of the truck L so as to occupy the entire space available, both in width and in length, with the sides A facing outwards from the deck P, and between each pair of adjacent dual units a separation gap S is defined, as described previously with reference to FIG. 13, in this case as well, at least in the order of 80 mm.

This dual arrangement of the unit 10 is particularly advantageous because, after transporting the poultry to the slaughterhouse of destination, it enables extraction of all the drawer-type cages 2 at the same time for their handling.

At the destination slaughterhouse, the drawer-type cages 2 containing the poultry are extracted from the frames 10 through the respective first sides A, possibly without the need to unload the units from the deck P.

FIGS. 14-17 illustrate, according to another aspect of the invention, the unique modes of extraction of the compound units of the frames 10, and the relative stacks of drawers 2 after they have been unloaded from the truck L.

The units are deposited one by one on a conveyor T, for example a motorized chain conveyor, and transferred in the direction of the arrows F towards two extraction stations E1, E2 arranged on opposite sides of the conveyor T. Each unit is in turn positioned at the extraction stations E1, E2, with the sides A, A of the relative frame 10 facing them. Then, motorized groups (not shown in detail) associated with the extraction stations E1, E2 simultaneously pick up the two stacks of drawer-type cages 2 (FIGS. 14-15) and extract them from the frame 10 in opposite directions H, perpendicular to the direction F. The drawer-type cages 2 can then be singularized and transferred to the slaughter line where the poultry is picked up from the drawers.

Figure 18:
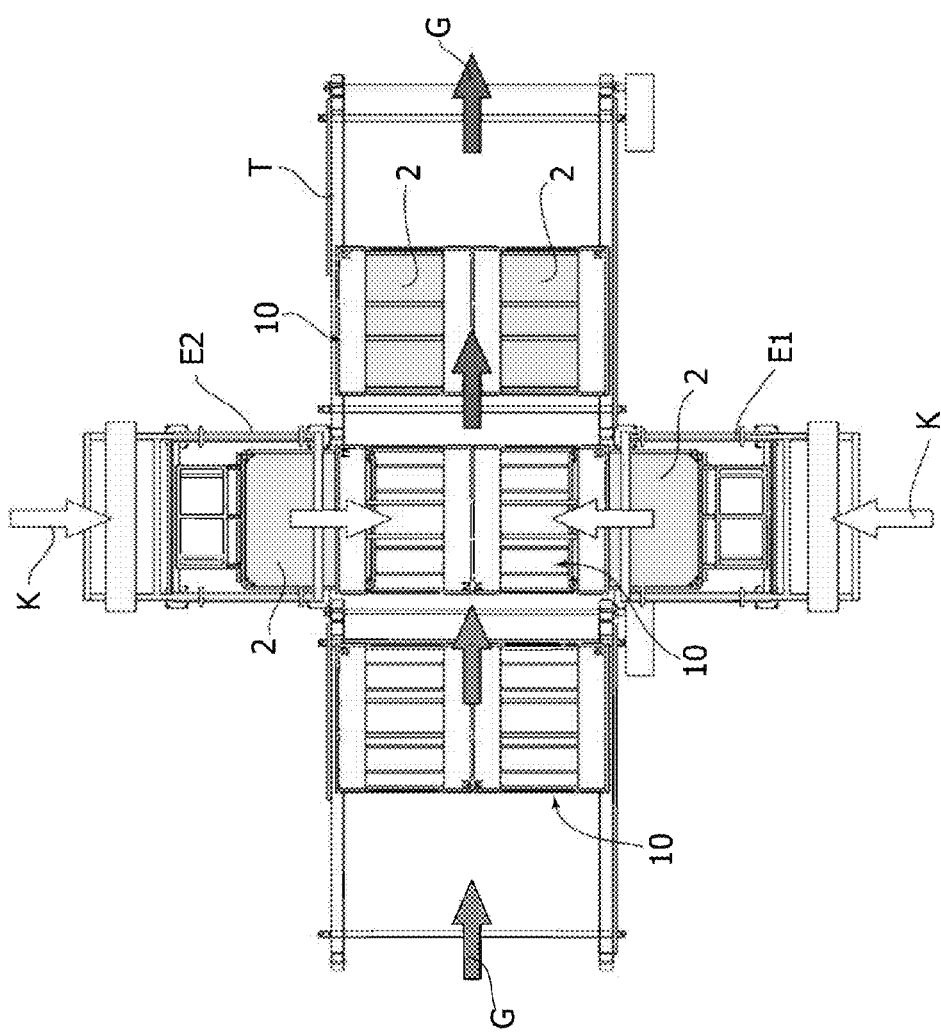
FIG. 18 is a view analogous to FIG. 14 showing an additional step of the handling method.
Figure 19:
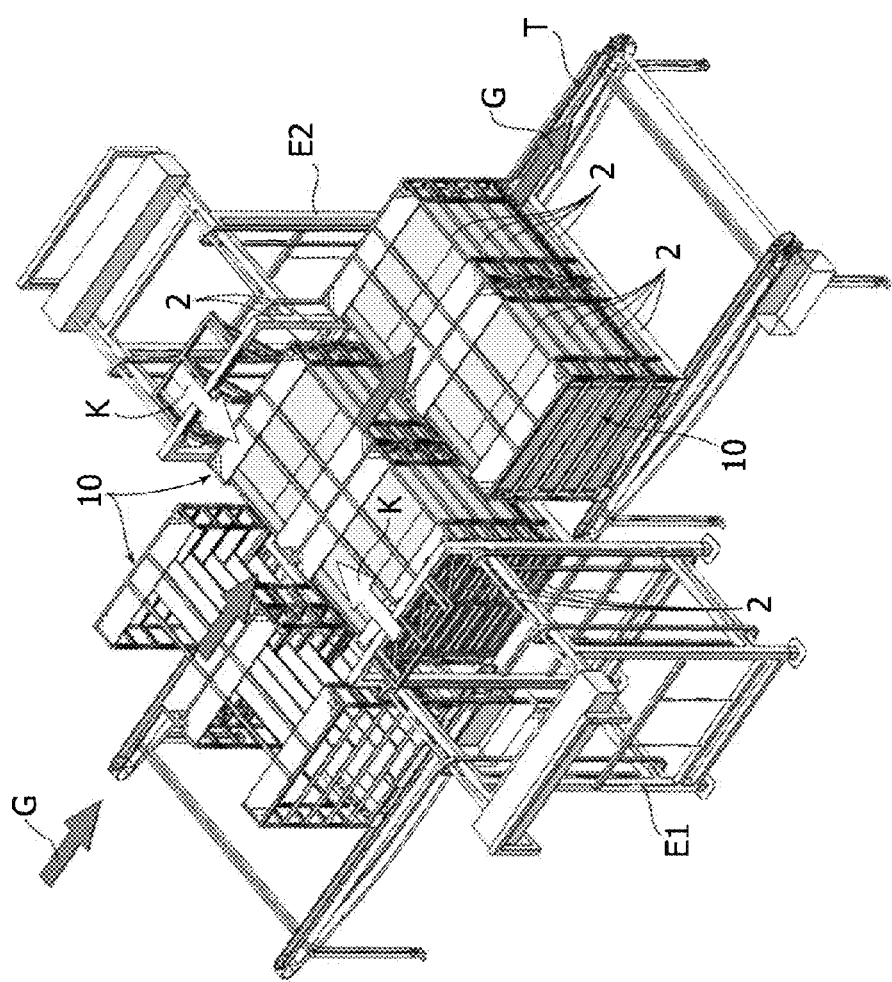
FIG. 19 is a perspective view of FIG. 18, at the end of the additional handling step.

The same or a similar group constituted by the conveyor T and the two juxtaposed stations E1, E2 is advantageously used to reinsert the stacks of drawer-type cages 2, after their emptying and possible washing, within the supporting frames 10 in the manner represented in FIGS. 18 and 19. The empty frames 10 are fed in succession in the direction of the arrows G and each time positioned with their respective sides A, A facing the units E1, E2 which insert the two stacks of drawers 2 within the frame 10 in opposite directions, indicated by the arrows K (FIG. 18). At the end (FIG. 19), the units formed by the frames 10 with the relative stacks of drawers 2 are picked up from the conveyor T and transferred to a transport truck L for return to the breeding farm.

Of course, the details of construction and the embodiments may vary widely with respect to those described and illustrated, without departing from the scope of the present invention as defined in the following claims.

Thus, the number of drawer-type cages 2 carried by the supporting frame 1 or 10 can be different and, for example, between 3 and 12.

The invention claimed is:

1. A transporting unit for live poultry including:
   a quadrangular supporting frame and a plurality of drawer-type cages open at the top, arranged in a superimposed condition in the supporting frame and slidably displaceable outwards through a first side of said supporting frame, in a partially extracted condition, to enable loading of the poultry from a site located at a second side of the frame, different from said first side, according to a procedure which involves filling of the lowermost drawer kept inserted within the frame, then re-insertion of the drawer set immediately above into the frame so as to close the top of the lowermost drawer, and repeating the same steps for each drawer until the uppermost drawer has been filled,
   wherein the supporting frame is configured so as to enable simultaneous loading of the poultry into each drawer-type cage from an additional site located at a third side of the supporting frame which is opposite to said second side, said second side and said third side being perpendicular to said first side.

2. A unit according to claim 1, wherein said second and third sides have respective unobstructed apertures for accessing the drawers which are configured so as to prevent extraction of the drawers therethrough.

3. A unit according to claim 2, wherein the fourth side of the supporting frame opposite the first side is configured so as to prevent extraction of the drawers therethrough.

4. A unit according to claim 2, wherein the frame is provided with horizontal bearing planes for sliding the drawers through said first side.

5. A unit according to claim 1, wherein the fourth side of the supporting frame opposite the first side is configured so as to prevent extraction of the drawers therethrough.

6. A unit according to claim 5, wherein the frame is provided with horizontal bearing planes for sliding the drawers through said first side.

7. A unit according to claim 1, wherein the frame is provided with horizontal bearing planes for sliding the drawers through said first side.

8. A unit according claim 7, wherein said slidable bearing planes consist of horizontal strips or bars connecting said first side with the fourth side of the frame, opposite to said first side, and essentially extending along the centerline of the frame.

9. A unit according claim 8, wherein said horizontal strips or bars interconnect horizontal crosspieces of said first and fourth sides of the frame without any difference in height.

10. A unit according to claim 1, wherein said first side of the frame is provided with locking means of the drawers when they are inserted within the frame.

11. A unit according to claim 1, wherein said frame is configured to contain two side-by-side groups of superimposed drawers and defines two first sides opposite to each other through which a respective group of drawers can be inserted and extracted, the arrangement being such as to enable simultaneous loading of the poultry into each one of said drawers from two pairs of side-by-side sites located at said second and third sides of the frame, respectively.

12. A method for handling live poultry comprising the steps of:
providing a transporting unit including a quadrangular supporting frame and a plurality of drawer-type cages open at the top, arranged in a superimposed condition in the supporting frame and slidably displaceable outwards through a first side of said supporting frame,
partially extracting the drawers located above the lowermost drawer through said first side of the frame,
loading the poultry into the lowermost drawer until it is filled, operating on a second side of the frame different from said first side,
inserting the drawer immediately above the lowermost drawer so as to close it at the top,
repeating the same steps until the uppermost drawer has been filled, and positioning a cover thereonto,
transferring said unit onboard a transport truck,
wherein loading of the poultry into each drawer is simultaneously carried out from at least one additional site located at a third side of the supporting frame which is opposite to the second side, said second side and said third side being perpendicular to said first side.

13. A method according to claim 12, wherein said frame is configured to contain two side-by-side groups of superimposed drawers defining two first sides opposite to each other through each one of which a respective group of drawers can be inserted and extracted, filling of said drawers being carried out by operating simultaneously from two pairs of sites arranged two-by-two in a side-by-side position and situated at said second and third sides of the frame, respectively.

14. A method according to claim 13 wherein said unit is positioned along with identical units on board said transport truck so as to occupy the entire width of the loading deck of the truck, with said first side facing outwards, and so that a separation gap is defined between each pair of adjacent units in the direction of the length of said loading deck.

15. A method according to claim 13 wherein at the end of transport, said units are transferred to a conveying line along which they are advanced towards two juxtaposed stations arranged at opposite sides of the line and where said drawers are simultaneously extracted through said first sides of the respective frames.

16. A method according to claim 12 wherein said unit is positioned along with identical units on board said transport truck so as to occupy the entire width of the loading deck of the truck, with said first side facing outwards, and so that a separation gap is defined between each pair of adjacent units in the direction of the length of said loading deck.

17. A method according to claim 16, wherein the separation gap is about at least 80 mm.

18. A method according to claim 16, wherein the drawer-type cages, when loaded with poultry, can be extracted from the first side of the relative frames maintained on board the transport truck.

19. A method according to claim 12 wherein at the end of transport, said units are transferred to a conveying line along which they are advanced towards two juxtaposed stations arranged at opposite sides of the line and where said drawers are simultaneously extracted through said first sides of the respective frames.

20. A method according to claim 19, wherein said drawers are subsequently reinserted simultaneously into the respective frames, through said first sides, at said two juxtaposed stations.

* * * * *